United States Patent
Goetz et al.

(10) Patent No.: US 12,049,929 B2
(45) Date of Patent: Jul. 30, 2024

(54) BELT PULLEY DECOUPLER

(71) Applicant: Schaeffler Technologies AG & Co. KG, Herzogenaurach (DE)

(72) Inventors: Andreas Goetz, Wilhelmsdorf (DE); Eugen Bauer, Crailsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/022,380

(22) PCT Filed: Aug. 24, 2021

(86) PCT No.: PCT/DE2021/100710
§ 371 (c)(1),
(2) Date: Feb. 21, 2023

(87) PCT Pub. No.: WO2022/042796
PCT Pub. Date: Mar. 3, 2022

(65) Prior Publication Data
US 2024/0035518 A1 Feb. 1, 2024

(30) Foreign Application Priority Data
Aug. 25, 2020 (DE) ...................... 10 2020 122 175.4

(51) Int. Cl.
*F16D 41/20* (2006.01)
*F16D 3/12* (2006.01)
(Continued)

(52) U.S. Cl.
CPC ................. *F16D 3/12* (2013.01); *F16D 3/72* (2013.01); *F16D 41/206* (2013.01); *F16H 55/36* (2013.01); *F16H 2055/366* (2013.01)

(58) Field of Classification Search
CPC . F16D 3/12; F16D 3/72; F16D 41/206; F16H 55/36; F16H 2055/366
See application file for complete search history.

(56) References Cited

U.S. PATENT DOCUMENTS 7,975,821 B2 * 7/2011 Antchak ............... F16D 41/206
474/70
2015/0060232 A1 * 3/2015 Tran ...................... F16D 41/206
192/41 S
(Continued)

FOREIGN PATENT DOCUMENTS

DE         10103082 A1    4/2002
DE    102015202527 B3 *  4/2016    ............. F16D 13/76
(Continued)

*Primary Examiner* — Lori Wu

(57) ABSTRACT

The disclosure relates to a belt pulley decoupler for transmitting torque between the belt of a belt drive and a shaft in driving connection therewith. The belt pulley decoupler includes a hub, a belt pulley, and a series circuit of a helical torsion spring, a wrap-around band, which surrounds the helical torsion spring with a radial gap, and a driver sleeve, which surrounds the wrap-around band and transmits the torque between the wrap-around band and the helical torsion spring. An outer periphery of the wrap-around band is in frictional contact with an inner lateral surface, which rotates conjointly with the belt pulley, and the outer periphery of the wrap-around band is also in frictional contact with the inner lateral surface of the driver sleeve. An end of the helical torsion spring is in contact with a radially inwardly extending spring plate of the driver sleeve.

16 Claims, 2 Drawing Sheets

(51) Int. Cl.
*F16D 3/72* (2006.01)
*F16H 55/36* (2006.01)

(56) References Cited

U.S. PATENT DOCUMENTS

2018/0045287 A1* 2/2018 Imai .................. F16C 33/782
2019/0136957 A1* 5/2019 Shimamura ............ F16H 55/36

FOREIGN PATENT DOCUMENTS

| DE | 102015224608 A1 * | 6/2017 | ............ F16D 13/76 |
| DE | 102016209598 A1 | 12/2017 | |
| DE | 102016211558 A1 * | 12/2017 | ............... F16D 3/12 |
| DE | 102018102577 A1 * | 8/2018 | |
| DE | 102018108426 A1 * | 10/2019 | ............... F16D 3/12 |
| WO | 2014022912 A1 | 2/2014 | |

* cited by examiner

BELT PULLEY DECOUPLER

CROSS-REFERENCE TO RELATED APPLICATIONS

This application is the U.S. National Phase of PCT Application No. PCT/DE2021/100710 filed Aug. 24, 2021, which claims priority to DE 10 2020 122 175.4 filed Aug. 25, 2020, the entire disclosures of which are incorporated by reference herein.

TECHNICAL FIELD

The disclosure relates to a belt pulley decoupler for transmitting torque between the belt of a belt drive and a shaft in driving connection therewith.

BACKGROUND

Torsional vibrations and irregularities that are introduced from the crankshaft of an internal combustion engine into the belt drive of the auxiliary units can, as is known, be compensated for by belt pulley decouplers, which are also referred to as simply decouplers or isolators and are typically designed as generator belt pulleys. The wrap-around band acts as a one-way clutch which, when closed, transfers torque from the belt pulley to the hub, wherein the resilience of the helical torsion spring connected in series with the wrap-around band smooths the torsional irregularities originating from the belt drive. When the belt pulley rotates with a delay, the wrap-around band opens, wherein—then vice versa—no significant torque can be transmitted from the hub to the belt pulley, so that the inert generator shaft can overtake the belt pulley.

Generic belt pulley decouplers are known, for example, from DE 10 2015 202 527 B3, DE 10 2015 224 608 A1, DE 10 2016 211 558 A1 or U.S. Pat. No. 7,975,821 B1. The rotational speed of the belt pulley decoupler, which is typically three to four times higher than that of the crankshaft, means that even a small deviation in coaxiality of the helical torsion spring from the axis of rotation generates a disruptive imbalance in the rotating belt pulley decoupler.

As a solution to this problem, it is proposed in DE 10 2018 108 426 A1, which is also generic, to design the wrap-around band end running on the side of the driver sleeve with radial indentations that deviate from the circular shape, so that this wrap-around band end centers the spring end running therein with a comparatively small inner sleeve circle.

The present disclosure is based on the object of improving the balancing of a belt pulley decoupler of the type mentioned above.

The solution thereto arises from the features described herein. Accordingly, the diameter of the inner lateral surface of the driver sleeve and the radial gap between the wrap-around band and the helical torsion spring should decrease toward the spring end which is contact with the spring plate of the driver sleeve. The reduction in the radial gap makes it possible to optimally center the spring end running on the side of the driver sleeve by means of the inner periphery of the wrap-around band in relation to the axis of rotation of the belt pulley decoupler. The radial indentations at the end of the wrap-around band mentioned above can be dispensed with, as the wrap-around band is wound with a constant wire cross-section and one of the following geometries.

The wrap-around band is purely cylindrical. The reduction in the inner diameter of the lateral surface of the driver sleeve forces the windings of the wrap-around band to adapt to the inner diameter of the lateral surface of the driver sleeve with a correspondingly reducing winding diameter.

The wrap-around band is purely cylindrical except for one or a few end turns that have a reduced diameter. The reduction in the inner diameter of the lateral surface of the driver sleeve forces the windings adjacent to the end windings to adapt to the inner diameter of the lateral surface of the driver sleeve with a correspondingly reducing diameter. The reduction in diameter of the end windings makes it easier to fit the wrap-around band into the driver sleeve with a comparatively large overlap (pressure) between these two components.

The winding diameter of the wrap-around band decreases in the axial overlapping area with the driver sleeve according to its inner diameter. The assembly of the wrap-around band in the driver sleeve is considerably simplified.

The diameter of the inner lateral surface of the driver sleeve can decrease in stages, or continuously. In this case, the inner lateral surface of the driver sleeve is in particular conical or parabolic in shape.

BRIEF DESCRIPTION OF THE DRAWINGS

Further features of the disclosure emerge from the following description and from the drawings, in which an exemplary embodiment of a belt pulley decoupler according to the disclosure for the generator arranged in the belt drive of the auxiliary unit of an internal combustion engine is shown. In the figures.

DETAILED DESCRIPTION

Figure 1:
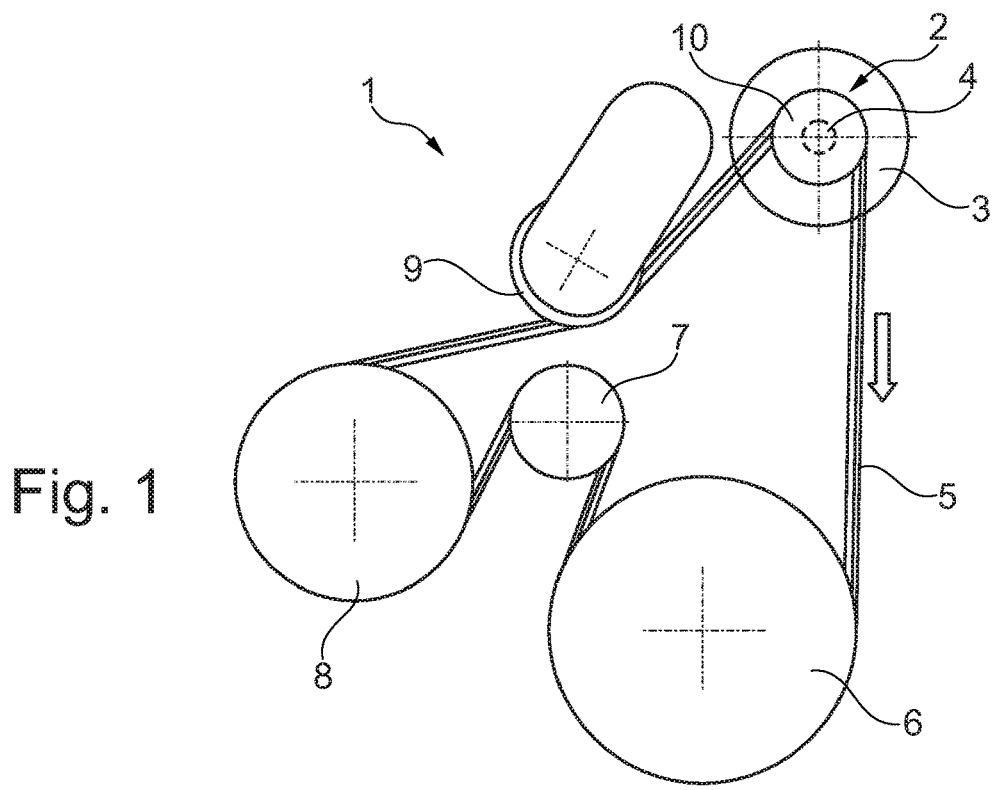
FIG. 1 shows a schematic view of the belt drive.

An auxiliary unit belt drive 1 of an internal combustion engine shown in FIG. 1 comprises a belt pulley decoupler 2 according to the disclosure, which is arranged on a generator 3 and drives its shaft 4. The belt 5 circulating in the direction shown is driven by the belt pulley 6 of a crankshaft and wraps around a deflection pulley 7, a belt pulley 8 of an air conditioning compressor, a tensioning pulley 9 of a belt tensioner and the belt pulley 10 of the belt pulley decoupler 2.

Figure 2:
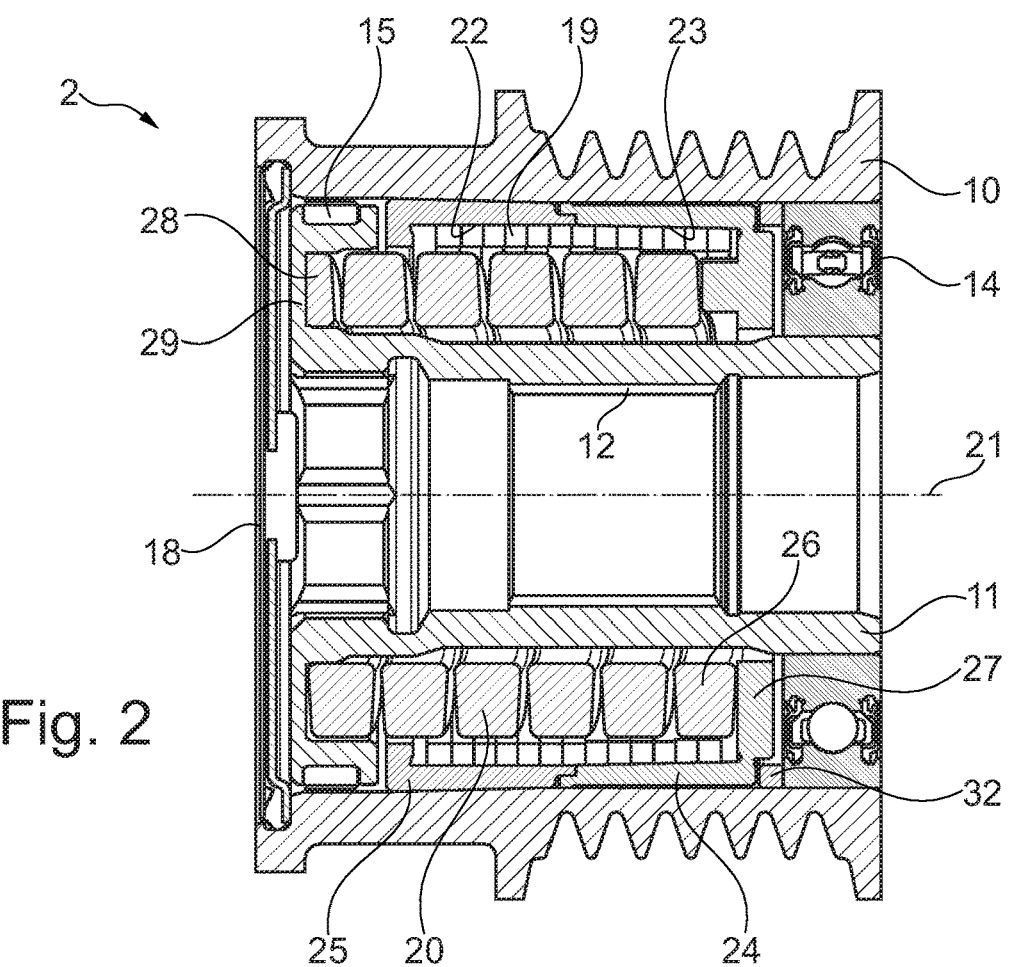
FIG. 2 shows the belt pulley decoupler in longitudinal section.
Figure 3:
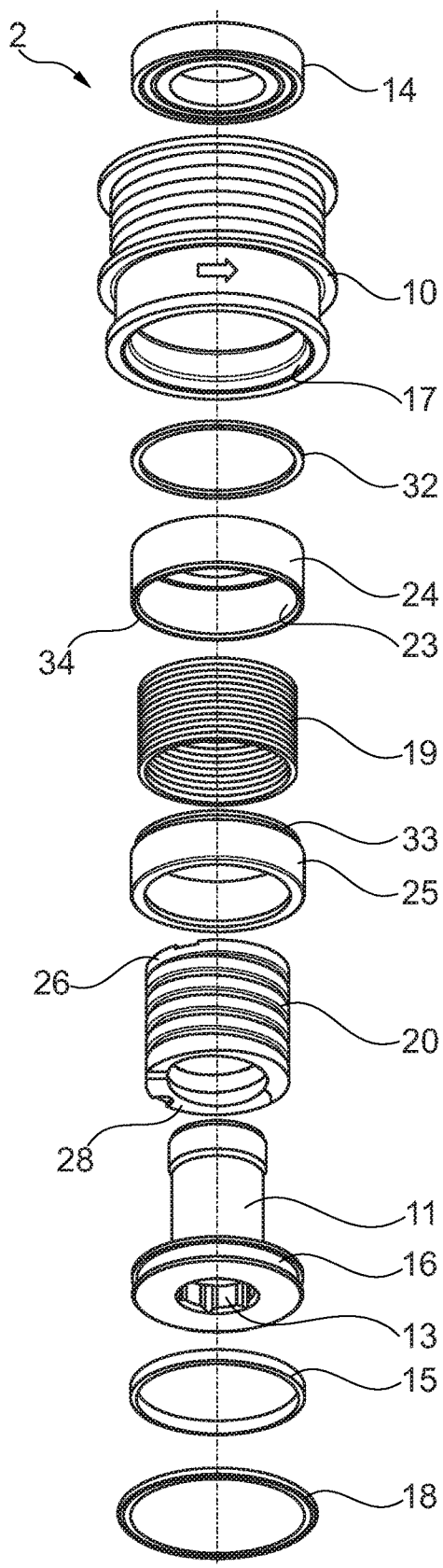
FIG. 3 shows the belt pulley decoupler in an exploded view from a first perspective.
Figure 4:
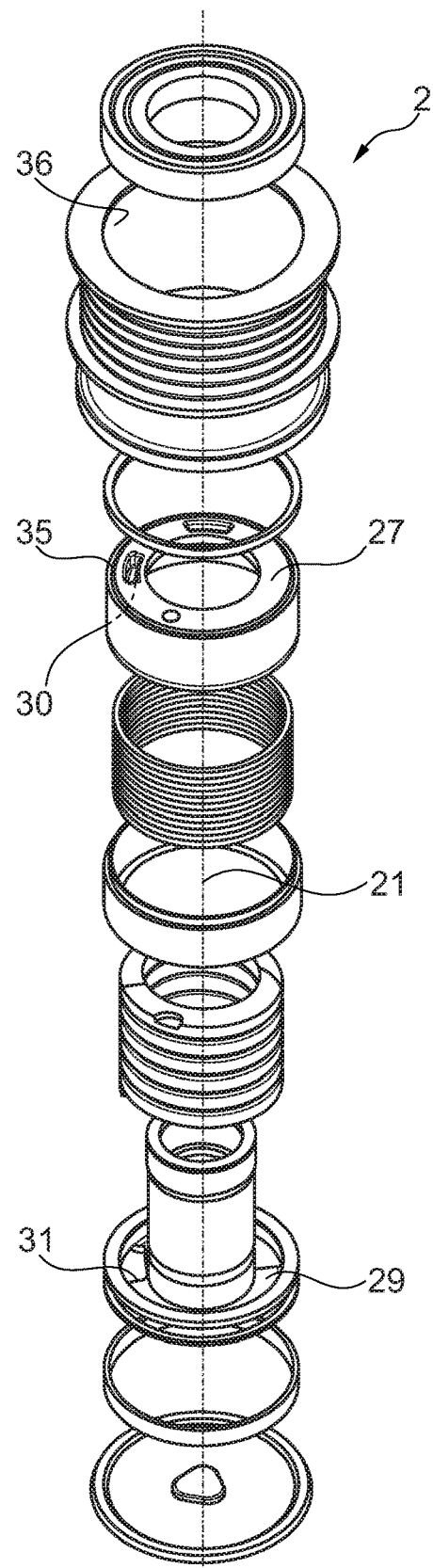
FIG. 4 shows the belt pulley decoupler in an exploded view from a second perspective.

FIGS. 2 to 4 show the belt pulley decoupler 2 in different representations. The belt pulley 10 is hollow-cylindrical and has an outer lateral surface which is profiled in accordance with the poly-V shape of the belt 5. The belt pulley 10, which is driven by the belt 5 in the direction of rotation shown in FIG. 3, is rotatably mounted on a hub 11, which is firmly screwed to the shaft 4 of the generator 3. For this purpose, the hub 11 has an internal thread 12 in the central section and a hexagon socket 13 at the front end section remote from the generator as an engagement contour for the screwing tool. The belt pulley 10 is mounted on the hub 11 radially and axially at the generator end by means of a rolling bearing and radially at the end remote from the generator by means of a plain bearing. The rolling bearing is a single-row ball bearing 14 sealed on both sides, and the plain bearing is a radial bearing ring 15 made of polyamide, which is axially enclosed in a circumferential groove 16 of the hub 11 and is in direct sliding contact with the inner lateral surface of the belt pulley 10. The belt pulley 10, at the end thereof remote from the generator, has a stepped enlargement in diameter 17 into which a protective cap 18 is snapped after the belt pulley decoupler 2 has been screwed onto the shaft 4.

The components essential to the function of the belt pulley decoupler 2 are a one-way clutch designed as a wrap-around band 19 and a helical torsion spring 20—connected in series with the wrap-around band 19 with regard to the torque flow from the belt pulley 10 to the hub 11—which ideally extends coaxially to the axis of rotation 21 of the pulley decoupler 2 in order to avoid undesired imbalance. The wrap-around band 19 is arranged radially between the belt pulley 10 and the helical torsion spring 20 and encloses the helical torsion spring 20 with a radial gap. The helical torsion spring 20 is left-hand wound and has a trapezoidal wire cross-section. The wrap-around band 19 is right-hand wound and in a purely cylindrical manner and has a rectangular wire cross-section that is constant over all windings.

The wrap-around band 19 and the helical torsion spring 20 have legless ends on both sides, which radially widen the windings of the wrap-around band 19 or the helical torsion spring 20 during the transmission of the torque. The outer periphery of the wrap-around band 19 is in frictional contact with an inner lateral surface 22, which rotates conjointly with the belt pulley 10, on the one hand, and with the inner lateral surface 23 of a driver sleeve 24, which is rotatable relative to the belt pulley 10, on the other hand, and braces itself against the inner lateral surfaces 22, 23 while transmitting the torque. The driver sleeve 24 is connected in series with the wrap-around band 19 and the helical torsion spring 20 in the torque flow and transmits the torque from the wrap-around band 19 to the helical torsion spring 20. The inner lateral surface 22 is formed by a drive sleeve 25 pressed into the belt pulley 10, which—as is explained further below—supports the driver sleeve 24 radially and, like the driver sleeve 24, is heat-treated for the purpose of wear resistance of its surface. However, the belt pulley 10 is not hardened.

The wrap-around band 19 enables the shaft 4 of the generator 3 and the hub 11 fastened to it to be overtaken in relation to the belt pulley 10. In this overtaking operation of the belt pulley decoupler 2, the wrap-around band 19 slips in the driver sleeve 24 and/or the drive sleeve 25, and the torque that can be transmitted is limited to the sliding friction torque between the two slipping contact partners.

The drive-side spring end 26 of the helical torsion spring 20 bears against a spring plate 27 which is part of the driver sleeve 24 and extends radially inward from the inner lateral surface 23 thereof. The spring end 28 on the output side rests against a spring plate 29 which is non-rotatable with the hub 11 and is also designed in one piece with the hub 11 in the present case. The helical torsion spring 20 is tensioned between the spring plates 27, 29 with an axial pretensioning force. The two spring plates 27, 29 each have a spring contact surface which springs back at a peripheral step 30 or 31, respectively. The torque transmitted from the belt pulley 10 to the hub 11 is transmitted via the pressure contact of the peripheral faces of the spring ends 26, 28 with the steps 30, 31 of the spring plates 27, 29, respectively.

The ideally coaxial centering of the helical torsion spring 20 on the axis of rotation 21 in order to avoid the spring imbalance is carried out on the output-side spring end 28 by the spring plate 29 which surrounds the spring end 28 with a narrow radial gap. The drive-side spring end 26 resting against the spring plate 27 of the driver sleeve 24 is centered by a likewise narrow radial gap between the wrap-around band 19 and the helical torsion spring 20. Starting from the drive sleeve 25, this radial gap decreases toward the spring end 26 in order to leave the spring-loaded coils between the spring ends 26, 28 enough free space for the radial expansion during torque transmission. The reduction of the radial gap is produced by a conically reducing inner diameter of the driver sleeve 24, in this case by about 0.3 mm, which forces a correspondingly decreasing winding diameter of the wrap-around band 19 braced with oversize in the driver sleeve 24.

As an alternative to the purely cylindrical shape of the wrap-around band in the present case, its ends can be wound with a reduced winding diameter in order to make it easier to thread the wrap-around band into the driver sleeve 24.

The rotary mounting of the driver sleeve 24 takes place on the one hand radially via the drive sleeve 25 and on the other hand both radially and axially via a plain bearing ring 32 made of polyamide inserted between the driver sleeve 24 and the ball bearing 14. The radial bearing formed by the drive sleeve 25 is a diameter step 33 which is formed on the end section of the drive sleeve 25 facing the driver sleeve 24 and the outer lateral surface of which radially supports the inner lateral surface of a diameter step 34 on the driver sleeve 24. The plain bearing ring 32 encloses the driver sleeve 24 on the outer lateral surface of a diameter step 35 in order to support the driver sleeve 24 radially against the inner lateral surface 36 of the belt pulley 10. The plain bearing ring 32 supports the driver sleeve 24, which is acted upon by the pretensioning force of the helical torsion spring 20, axially against the outer ring of the ball bearing 14.

The present rotary bearing makes it possible to mount the driver sleeve 24 without contact with the inner lateral surface 36 of the non-hardened belt pulley 10 on the one hand and to dimension the sleeve wall thickness largely the same size and stable as the wall thickness of the drive sleeve 25 on the other hand.

In contrast to the alternative possible axial bearing of the driver sleeve 24 against the inner ring of the ball bearing 14 and its radial bearing against the hub 11, a relative movement on the plain bearing ring 32 only takes place when the belt pulley decoupler 2 is overrunning. As the time portion of the overrunning operation is significantly less than the (torque-transmitting) normal operation, this bearing design contributes to a reduction in the operational frictional losses of the belt pulley decoupler 2.

The invention claimed is:

1. A belt pulley decoupler for transmitting torque between a belt of a belt drive and a shaft in driving connection therewith, the belt pulley decoupler comprising:
   a hub fastened to the shaft,
   a belt pulley rotatably mounted on the hub, and
   a series torque flow circuit comprising:
      a helical torsion spring arranged in a torque flow between the belt pulley and the hub,
      a wrap-around band, which surrounds the helical torsion spring with a radial gap, and
      a driver sleeve, which surrounds the wrap-around band and transmits a torque between the wrap-around band and the helical torsion spring, and
   an outer periphery of the wrap-around band configured to be in frictional contact with an inner lateral surface rotating conjointly with the belt pulley, and
   an outer periphery of the wrap-around band configured to be in frictional contact with an inner lateral surface of the driver sleeve, and an end of the helical torsion spring configured to be in contact with a radially inwardly extending first spring plate of the driver sleeve, wherein a diameter of the inner lateral surface of the driver sleeve and the radial gap between the wrap-around band and the helical torsion spring decreases toward a spring end of the helical torsion spring in contact with the first spring plate of the driver sleeve.

2. The belt pulley decoupler according to claim 1, wherein the diameter of the inner lateral surface of the driver sleeve decreases continuously.

3. The belt pulley decoupler according to claim 2, wherein the inner lateral surface of the driver sleeve is conical or parabolic in shape.

4. The belt pulley decoupler of claim 1, wherein the helical torsion spring is left-hand wound and the wrap-around band is right-hand wound.

5. The belt pulley decoupler according to claim 1, further comprising a second spring plate configured to be non-rotatable with the hub, and the helical torsion spring is tensioned between the first and second spring plates.

6. The belt pulley decoupler according to claim 5, wherein the second spring plate is formed integrally with the hub.

7. The belt pulley decoupler according to claim 5, further comprising a rolling bearing arranged at a first end of the belt pulley and a first plain bearing arranged at a second end of the belt pulley.

8. The belt pulley decoupler according to claim 7, wherein the first plain bearing is arranged radially between the second spring plate and an inner lateral surface of the belt pulley.

9. The belt pulley decoupler according to claim 7, further comprising a second plain bearing arranged axially between the rolling bearing and the second spring plate.

10. A belt pulley decoupler comprising:
a hub configured to be fastened to a shaft,
a belt pulley rotatably mounted on the hub, and
a series torque flow circuit comprising:
  a helical torsion spring arranged in a torque flow between the belt pulley and the hub,
  a wrap-around band surrounding and forming a radial gap with the helical torsion spring, and
  a driver sleeve surrounding the wrap-around band and configured to transmit a torque between the wrap-around band and the helical torsion spring, and
an outer periphery of the wrap-around band configured to be in frictional contact with an inner lateral surface rotating conjointly with the belt pulley, and
an outer periphery of the wrap-around band configured to be in frictional contact with an inner later surface of the driver sleeve, and
an end of the helical torsion spring configured to be in contact with a radially inwardly extending first spring plate of the driver sleeve,
wherein a diameter of the inner lateral surface of the driver sleeve and the radial gap between the wrap-around band and the helical torsion spring decreases toward a spring end of the helical torsion spring in contact with the first spring plate of the driver sleeve.

11. The belt pulley decoupler according to claim 10, wherein the diameter of the inner lateral surface of the driver sleeve decreases continuously.

12. The belt pulley decoupler according to claim 10, further comprising a second spring plate configured to be non-rotatable with the hub, and the helical torsion spring is tensioned between the first and second spring plates.

13. The belt pulley decoupler according to claim 12, wherein the second spring plate is formed integrally with the hub.

14. The belt pulley decoupler according to claim 12, further comprising a rolling bearing arranged at a first end of the belt pulley and a first plain bearing arranged at a second end of the belt pulley.

15. The belt pulley decoupler according to claim 14, wherein the first plain bearing is arranged radially between the second spring plate and an inner lateral surface of the belt pulley.

16. The belt pulley decoupler according to claim 14, further comprising a second plain bearing arranged axially between the rolling bearing and the second spring plate.

* * * * *